(12) United States Patent
Lacome et al.

(10) Patent No.: US 10,386,175 B2
(45) Date of Patent: Aug. 20, 2019

(54) PIPE MEASUREMENT

(71) Applicant: Acergy France SAS, Suresnes (FR)

(72) Inventors: Jacques Lacome, Sucy en Brie (FR); Jue Wang, Sartrouville (FR); Cesar Atin, Nanterre (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 14/402,104

(22) PCT Filed: May 16, 2013

(86) PCT No.: PCT/IB2013/001327
§ 371 (c)(1),
(2) Date: Nov. 18, 2014

(87) PCT Pub. No.: WO2013/171580
PCT Pub. Date: Nov. 21, 2013

(65) Prior Publication Data
US 2015/0116728 A1    Apr. 30, 2015

(30) Foreign Application Priority Data

May 18, 2012  (GB) .................................. 1208824.1

(51) Int. Cl.
*G01B 11/24*  (2006.01)
*G01B 11/00*  (2006.01)
*G01M 99/00*  (2011.01)

(52) U.S. Cl.
CPC ............ *G01B 11/00* (2013.01); *G01B 11/002* (2013.01); *G01M 99/00* (2013.01)

(58) Field of Classification Search
CPC ..... G01B 11/24; G01B 11/00; G01B 11/2518; G01N 21/954; G01N 21/952; G01N 21/95; G01N 2021/9548; G01M 99/00
USPC ..... 356/601–623, 237.1–237.5, 241.1–241.3
See application file for complete search history.

(56) References Cited

U.S. PATENT DOCUMENTS

| 3,755,908 A |  | 9/1973 | VerNooy |
| 3,973,441 A |  | 8/1976 | Porter |
| 5,198,877 A | * | 3/1993 | Schulz ............... G01B 11/24 |
|  |  |  | 356/141.4 |

(Continued)

FOREIGN PATENT DOCUMENTS

| CN | 101571379 | 11/2009 |
| DE | 44 06 914 | 9/1995 |

(Continued)

*Primary Examiner* — Hoa Q Pham
(74) *Attorney, Agent, or Firm* — Levy & Grandinetti

(57) ABSTRACT

A method is disclosed of measuring a hollow object such as a pipe including temporarily attaching to that object a reference target support such as a stencil that supports a plurality of scannable reference targets. When scanning the object with a movable scanner, most conveniently a hand-held scanner, the reference targets provide a positional reference for the scanner. A reference target support that is attachable to or movable along a hollow object has a display face presenting and supporting a plurality of scannable reference targets. The display face can stand up from a surface of the object or can lie against a surface of the object. The reference target support and the scanner can be movable together along a pipe as an internal inspection pig.

12 Claims, 4 Drawing Sheets

(56) References Cited

U.S. PATENT DOCUMENTS

| | | | |
|---|---|---|---|
| 5,622,170 A * | 4/1997 | Schulz | A61B 5/0064 356/141.1 |
| 5,757,499 A | 5/1998 | Eaton | |
| 6,122,541 A * | 9/2000 | Cosman | A61B 90/10 600/426 |
| 6,459,481 B1 * | 10/2002 | Schaack | A61B 5/1076 356/241.1 |
| 6,508,403 B2 | 1/2003 | Arsenault et al. | |
| 7,113,878 B1 | 9/2006 | Loferer et al. | |
| 7,197,836 B2 | 4/2007 | Kikuti | |
| 7,851,758 B1 | 12/2010 | Scanlon et al. | |
| 7,908,758 B2 | 3/2011 | Rattunde | |
| 2003/0021453 A1 * | 1/2003 | Weise | A61B 5/1178 382/128 |
| 2003/0063292 A1 | 4/2003 | Mostafavi | |
| 2003/0112448 A1 | 6/2003 | Maidhof et al. | |
| 2004/0002642 A1 | 1/2004 | Dekel et al. | |
| 2006/0007452 A1 | 1/2006 | Gaspard et al. | |
| 2006/0026852 A1 | 2/2006 | Kikuti | |
| 2007/0162255 A1 | 7/2007 | Chiu | |
| 2007/0265728 A1 | 11/2007 | Marsh et al. | |
| 2008/0065348 A1 | 3/2008 | Dowd | |
| 2009/0067706 A1 * | 3/2009 | Lapa | G01B 11/245 382/154 |
| 2009/0128557 A1 | 5/2009 | Finlayson et al. | |
| 2010/0134598 A1 | 6/2010 | St-Pierre et al. | |
| 2012/0048940 A1 | 3/2012 | Chaumont et al. | |
| 2012/0265479 A1 * | 10/2012 | Bridges | G01C 15/002 702/135 |
| 2013/0028478 A1 * | 1/2013 | St-Pierre | G01B 17/02 382/103 |

FOREIGN PATENT DOCUMENTS

| | | |
|---|---|---|
| EP | 0 444 800 | 9/1991 |
| EP | 1 122 513 | 8/2001 |
| EP | 1 143 221 | 10/2001 |
| EP | 2 330 380 | 6/2011 |
| EP | 2 407 752 | 1/2012 |
| GB | 2 094 470 | 9/1982 |
| GB | 2 204 947 | 11/1988 |
| JP | 56-081417 | 7/1981 |
| JP | 8-285780 | 11/1996 |
| JP | 2005-283600 | 10/2005 |
| JP | 2007-147498 | 6/2007 |
| KR | 10-0655559 | 12/2006 |
| WO | WO 97/14016 | 4/1997 |
| WO | WO 2006/089514 | 8/2006 |
| WO | WO 2006/094409 | 9/2006 |
| WO | WO 2007/033702 | 3/2007 |
| WO | WO 2009/030187 | 3/2009 |
| WO | WO 2010/048960 | 5/2010 |
| WO | WO 2011/138741 | 11/2011 |
| WO | WO 2011/151538 | 12/2011 |

* cited by examiner

PIPE MEASUREMENT

This invention relates to measurement of pipes, for example as used in subsea pipelines.

Subsea pipelines typically comprise a succession of pipe sections or joints' that are welded together end-to-end. Welding is performed offshore on a pipelay vessel in S-lay or J-lay operations or onshore at a coastal spoolbase when spooling pipes for reel-lay operations.

A storage and transportation period of several months and a journey of thousands of kilometers may lie between manufacturing pipe sections in a factory and fabricating a pipeline from those pipe sections. Meanwhile, the pipe sections may experience post-manufacturing dimensional variations arising from deformation, corrosion or other damage during handling, storage and transport, in addition to normal within-tolerance variations of manufacture.

Clearly, it is important to know the dimensions of a pipe section before it is welded into a pipeline. Even if no significant dimensional variations arise after manufacture, it is necessary to validate and confirm measurements made at the time of manufacture.

Measurement of a pipe section is particularly important at each end region, as the ends must interface with adjoining pipe sections of a pipeline via circumferential girth welds. Desirable measurements include internal and external diameter, wall thickness; out-of-roundness or 'ovalisation', including local out-of-roundness; planarity of the pipe end; and longitudinal curvature or departure from longitudinal straightness.

The ongoing risk of dimensional variations through handling, storage and transport means that measurements cannot be made too long before a pipe section is fabricated into a pipeline. It may therefore be appropriate to measure pipe sections in challenging conditions on a pipelay vessel or on a supply barge at sea, or at a coastal yard or spoolbase before the pipe sections are loaded or spooled onto the vessel or barge. There may be little space in which to operate and the weather and sea conditions may make accurate measurement particularly difficult.

It is important that the time taken to measure each pipe section does not affect the critical path, in which successive welding, weld testing and field joint coating operations determine the rate of pipeline fabrication. Indeed, in S-lay and J-lay operations, the rate of pipeline fabrication determines the rate of pipelaying itself.

Various techniques have been proposed for scanning an object such as a pipe to inspect it. Many require the inspected object and a measuring device to be connected physically to provide a positional reference. Where the object is a pipe, either the pipe turns and/or moves axially inside a frame that supports the measuring device, or a bug or probe turns and/or moves axially with respect to the pipe. For example, a laser bug or a caliper arrangement may run on a steel ring clamped onto the pipe end, although this gives only the cross-sectional geometry.

Prior art examples illustrating general scanning principles are disclosed in EP 0444800; U.S. Pat. No. 7,197,836; US 2007/162255; U.S. Pat. No. 7,908,758; WO 2006/089514, which uses a thermal camera in a pipe-rolling mill; WO 2009/030187, which uses ultrasound to scan an axially-moving pipe; JP 8285780, which uses a laser projected onto a pipe surface and connected to the pipe by a support structure; JP 56081417, which performs optical sensing on a rotating pipe, CN 101571379, which performs laser scanning on the pipe held by a frame; WO 2011/151538, which scans a rotating pipe; and EP 2330380, in which lasers are mounted on a frame around the pipe.

In U.S. Pat. No. 5,757,499, a movable scanning device is used to capture the location of separate targets. There is no disclosure of capturing the geometry of a pipe wall relative to the reference provided by the targets.

U.S. Pat. No. 7,113,878 discloses a reference target assembly for calibrating a non-contact laser sensor as used in a manufacturing environment, such as fabrication of vehicle bodies. The reference target assembly is not attached to the object nor do the reference targets provide a positional reference for the scanner during movement of the scanner.

None of the above prior art proposals provide an appropriate solution in the demanding context of use of the present invention. They are more appropriate for use in controlled factory conditions than for use in the field. They take up too much space and involve lengthy set-up. They require access to parts of a pipe section that may be inaccessible, for example when pipe sections are in a stack. Also, there may be no opportunity to turn or otherwise move a pipe section during measurement, as many of the prior art proposals demand.

As an example of other prior art, so-called 'intelligent pigs' are known for performing internal pipe inspection. These combine the typical pig architecture—spaced, parallel cups or plates joined by an axially-extending shaft—with a measuring device mounted on the shaft between the cups or plates. The measuring device generally employs strain gauges mounted on a caliper mechanism. Examples are disclosed in KR 100655559, U.S. Pat. Nos. 3,755,908 and 3,973,441.

Whilst the present invention may be used in conjunction with specially-designed intelligent pigs, such pigs, in isolation, do not provide a sufficiently broad solution because they are designed to measure the pipe interior rather than the interior, exterior and edges of the pipe end regions.

More generally, other 3D scanning systems are known in the prior art, such as systems employing laser theodolites. Such systems generally require a fixed reference point that is external to the measured system such that short-range measurement is not possible; alternatively, they use no fixed reference point at all in full-3D systems, with triangulation positioning.

Laser distance measurement employing theodolites, such as disclosed in DE 4406914, involves using a fixed base such as a tripod. An absolute positioning reference has to be set before any relative measurement; also, such systems are designed for long-range measurements. WO 2007/033702 triangulates with a fixed point, whereas in US 2008/0065348, the reference is a flag on one component to be assembled with another component. EP 1143221 discloses a method to position a coordinate system in 3D with two cameras, but not how to acquire the 3D geometry of an object. Again, none of these documents are relevant to the problems addressed by the present invention.

US 20120048940, EP 2407752, WO 2010/048960 and GB 2204947 are examples of scanners that are movable around an object to be scanned, without a connecting structure between the scanner and that object to provide a positional reference. Some of such scanners may be hand-held, being movable with six degrees of freedom around an object to be scanned. Relative to the other prior art discussed above, these proposals have advantages of compactness and ease of use because the object to be scanned can remain stationary and there is no need for a connecting structure to provide a positional reference. Instead, hand-held scanners require a positioning facility to determine their position on X, Y and Z axes and their orientation, for example in terms of yaw, roll and pitch; this presents other challenges.

An example of a hand-held laser scanner is disclosed in U.S. Pat. No. 6,508,403, which describes a 3D scanning system that uses an ultrasonic, inertial or optical positioning device integrated into a portable hand-held scanning apparatus. WO 2006/094409 and WO 2011/138741 take the hand-held scanner concept further, proposing the use of a pattern of reference targets applied to the object to be inspected. The system builds a model of the 3D position of those targets and monitors the spatial relationship between the object and the scanning device using that model. This provides a reference location for the scanning device relative to the object at each instant during a scanning operation as it builds a model of the object, such as its dimensional characteristics in a scanned volume.

The reference targets must remain fixed relative to the object throughout the scanning operation. Also, the pattern of reference targets must be extensive enough and dense enough that the scanning device can always 'see' enough targets to determine its position and orientation relative to the object, throughout relative movement between the scanning device and the object during the scanning operation.

The reference targets in WO 2006/094409 and WO 2011/138741 are a pattern of individual retro-reflective dots applied to the object, for example by adhesives or adhesive tape. Applying the reference targets is time-consuming and difficult, particularly inside a pipe, and there is a risk of some reference targets slipping or becoming dislodged, especially in wet and windy conditions characteristic of marine operations. If a reference target moves during the scanning operation, there is clearly a risk that the operation will produce misleading data about the object being scanned.

Another positioning approach suitable for static objects is to project a reference pattern of dots onto the object from a projector separate from the movable scanning device, which projector remains stationary and hence in fixed relation to the static object throughout the scanning operation. This approach is not appropriate for the purposes of the invention. It is impractical to project a reference pattern inside a pipe and a projector represents undesirable additional equipment, requiring substantial additional space and careful fixing, and adding complexity.

Whether reference targets are projected on or attached to an inner or outer pipe surface, another problem is that such targets cannot clearly be seen and distinguished by a scanning device when that device is end-on to a pipe section. If the scanning device loses its reference location relative to the object as a result, the scanning operation will either break down or produce misleading data about the object being scanned.

For example, JP 2007-147498 employs a target pattern fixed inside an inspected tube whose image is correlated with the objective position. The geometry of the target pattern is scanned, not the geometry of another object relative to the target pattern. This reflects the general approach shared by WO 2011/138741 as noted above. The target pattern cannot be re-used for another pipe, as it has to be reinstalled each time; also visibility of the target pattern is restricted when scanned from outside an end of the pipe. Nor may scanning be performed at an end edge of the pipe between external and internal surfaces of the pipe.

Whilst the reference target arrangements proposed in WO 2006/094409 and WO 2011/138741 to Creaform Inc. of Québec are disadvantageous for the purposes of the present invention, it is envisaged that the invention can most conveniently employ a hand-held scanner as proposed in those documents and as offered by Creaform Inc. under its trade mark 'Handyscan 3D'.

The invention involves the use of a removable reference target and scanning an object relative to that target whereas the prior art teaches directly scanning the object or scanning a target on the object relative to an external reference.

Against this background, the invention resides in a method of measuring a hollow object such as a pipe or another object fitted to that hollow object, the method comprising: attaching to the object at least one reference target support that supports a plurality of scannable reference targets; and scanning the object with a hand-held movable scanner, wherein the scanner uses the plurality of reference targets of the reference target support to provide a positional reference for the scanner during movement of the scanner.

The method may comprise any or all of scanning an internal surface of the object; scanning an external surface of the object; and/or scanning an edge of the object between the internal and external surfaces of the object during a scanning operation.

Preferably, the reference target support is attached to the object inboard of an end of the object and the scanner is used to scan an end portion of the object outboard of that support. Where the object is a pipe, the reference target support suitably extends around the pipe against an internal or external surface of the pipe. More generally, the reference target support may extend at least partially around or within the object as an internal or external band or tube.

To maximise visibility of reference targets to a scanner, the method of the invention advantageously comprises attaching to the object at least one reference target support that presents a plurality of reference targets on a face upstanding from a surface of the object to which that support is attached, for example extending inwardly from an internal surface of the object or outwardly from an external surface of the object. It is also, or alternatively, possible for the reference target support to present a plurality of reference targets on a cylindrical or part-cylindrical face lying against a correspondingly-curved surface of the object to which that support is attached.

At least one reference target support is preferably attached temporarily to the object and, after scanning, is removed from the object for optional re-use on another object to be measured.

Also within the inventive concept is a reference target support that is attachable to a hollow object such as a pipe for use in measuring that object with a movable scanner, wherein the support has a display face presenting and supporting a plurality of scannable reference targets for enabling the scanner to maintain a positional reference during scanning movement.

The display face may, for example, have a curved inner or outer interface edge shaped to lie against a correspondingly-curved surface of the object. Preferably, the reference target support has self-supporting rigidity so that the display face can stand up from a surface of the object to which the support may be attached. It is also possible for at least part of the reference target support to lie against an underlying surface of the object to which the support may be attached, while defining a cylindrical or part-cylindrical display face. For example, the reference target support may be flexible to conform with the underlying surface of the object.

The inventive concept also extends to the combination of a hollow object such as a pipe and at least one reference target support of the invention. So, in that combination, the reference target support is preferably attached to the object inboard of an end of the object, and suitably extends around the object against an internal or external surface of the object.

The inventive concept also finds expression in a system for measuring a hollow object such as a pipe, operating in accordance with the method of the invention or employing a reference target support of the invention, or a combination of an object and such a reference target support.

In summary, the invention provides a method of measuring a hollow object such as a pipe and comprises temporarily attaching to that object a reference target support such as a stencil that supports a plurality of scannable reference targets. When scanning the object with a hand-held movable scanner, the reference targets provide a positional reference for the scanner.

The invention also provides a reference target support such as a stencil that is attachable to a hollow object. The reference target support has a display face that presents and supports a plurality of scannable reference targets. The display face can stand up from a surface of the object or may lie against a surface of the object.

Thus, the present invention discloses additions to prior art methods and tools to inspect the geometry of hollow objects such as pipe ends, both externally and internally. The invention diverges from the prior art in that the support for the target pattern to be recognised by the scanning device may be a removable, reusable stencil, specially designed and made for acquiring the dimensions of a hollow object.

The advantages of the invention include light weight, portability and an ability to be used in any practical circumstances on any appropriate objects. The invention is apt to be used outside a controlled factory environment in a storage yard or at sea, while solving the problem of taping positioning targets onto the product to be scanned and reducing the time necessary to carry out scanning operations.

The invention discloses methods to acquire a 3D mock-up of the actual geometry of a hollow tubular object end, such as a pipe. It uses a stencil as a reference, which fits on or near an end of the hollow object.

The stencil design can be specific to pipe diameter or shape dimensions or can cover a range of diameter or shape dimensions. It is temporarily fixed to the product to be scanned and a special positioning target arrangement is used to define a zero position.

The stencil can be a disc, a ring, a cylinder, a tape or other shape such as a pan shape with positioning targets on its visible surface, which can be installed on or near the extremity of the object, inside the object and/or around the object. This stencil allows a scanner reliably to position a scanned point in space on X, Y and Z coordinates.

The scanner itself and the methods it uses to scan are not the subject of this invention. The target geometry on the stencil is defined by the scanner.

In order that the invention may be more readily understood, reference will now be made, by way of example, to the accompanying drawings in which.

Figure 5:
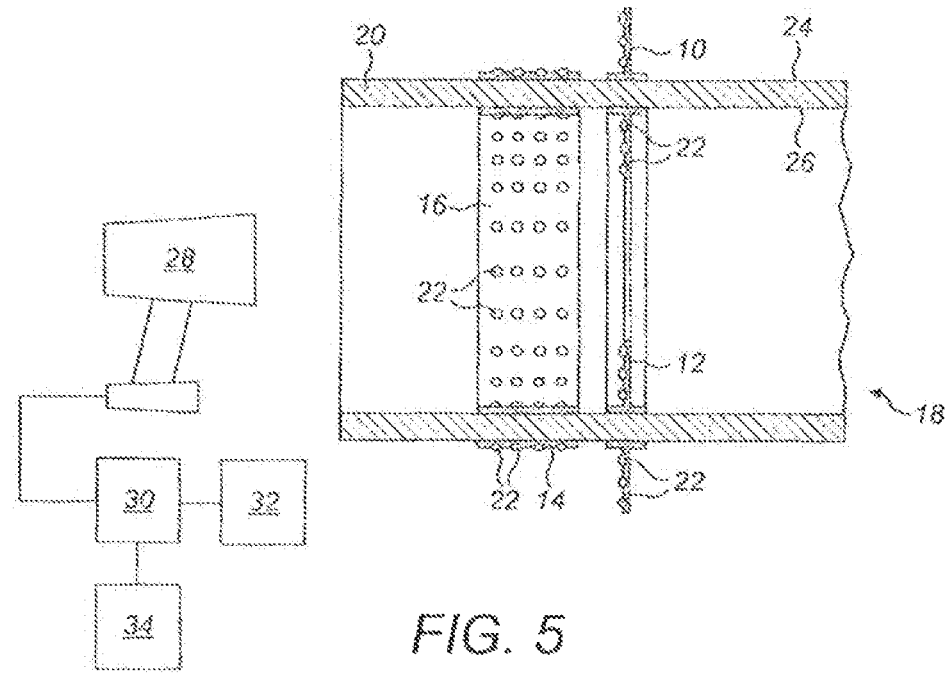
FIG. 5 is a part-sectional side view of an end region of a pipe section fitted with one of each of the reference target stencils shown in FIGS. 1 to 4, and also showing a hand-held scanner apt to be used with those stencils.
Figure 6:
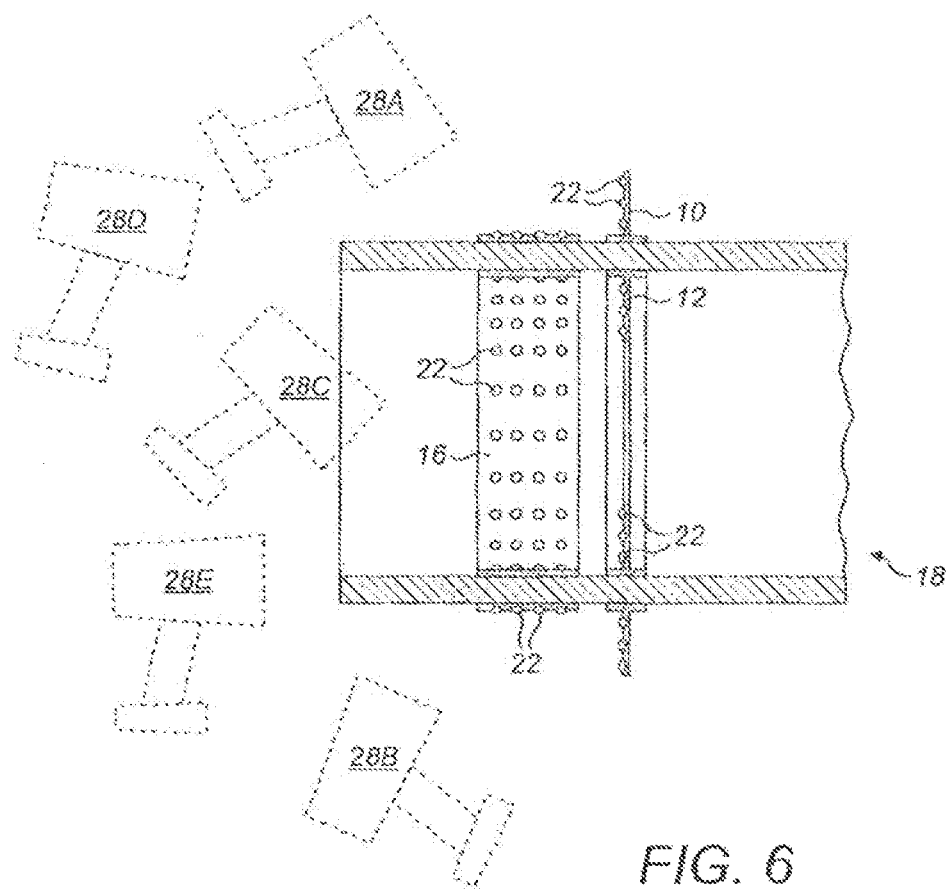
Figure 7:
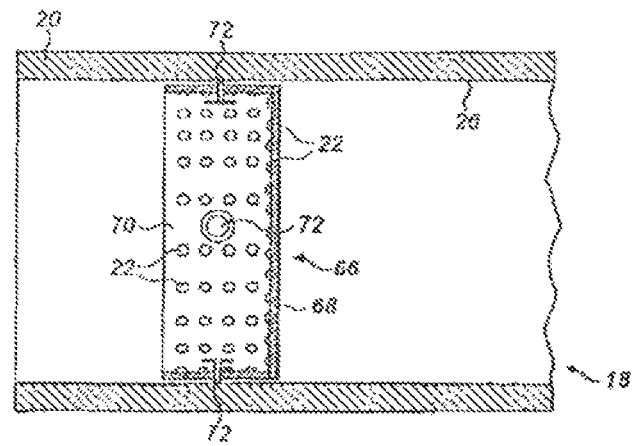
Figure 8:
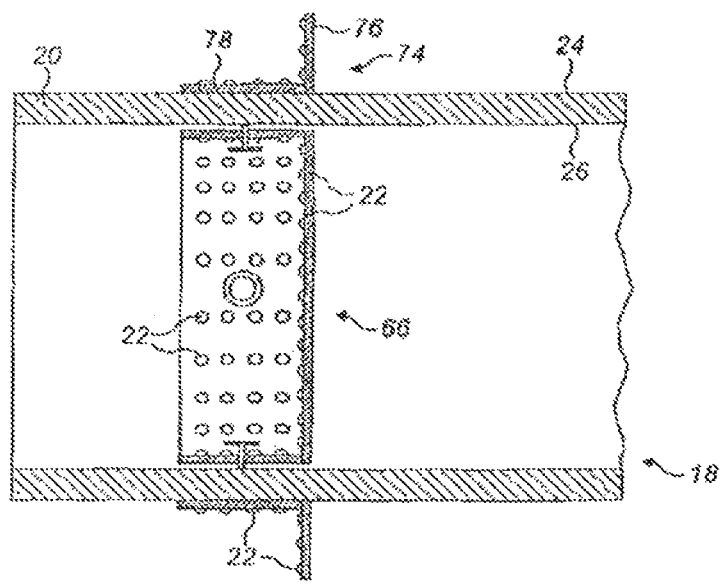

FIG. 6 corresponds to FIG. 5 and shows how the hand-held scanner may be manipulated freely around the end region of the pipe section to measure its dimensional characteristics;

FIG. 7 corresponds to FIG. 5 but replaces the reference target stencils of FIGS. 1 to 4 with an internal reference target stencil that integrates a cylindrical display face and a disc-shaped radial display face; and FIG. 8 corresponds to FIG. 7 and supplements the internal reference target stencil with an external reference target stencil that integrates a cylindrical display face and an annular radial display face.

To illustrate the general principle of the invention, FIGS. 1 to 4 show various reference target stencils in accordance with the invention, numbered 10, 12, 14 and 16 respectively. In each case, the stencil 10, 12, 14, 16 is applied to a pipe section 18 a short distance inboard from one end. This leaves an end portion 20 of the pipe section 18 exposed for scanning to determine its dimensional characteristics.

Figure 1:
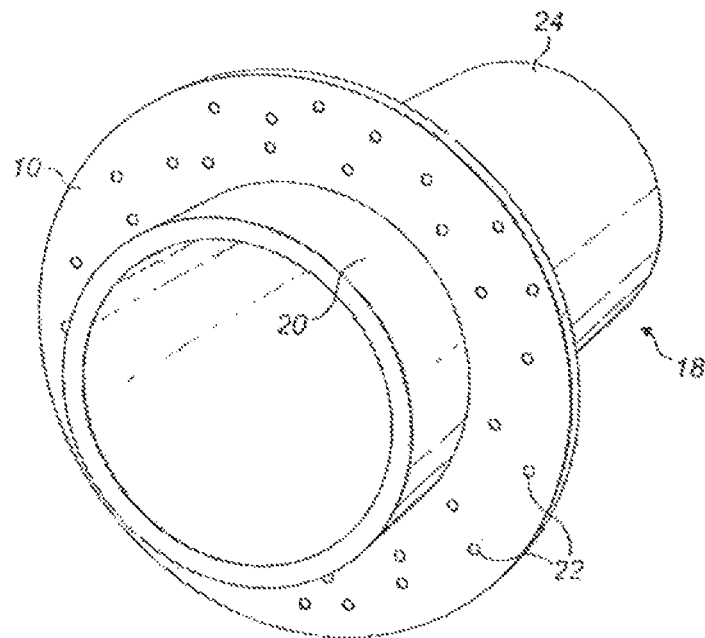
FIG. 1 is a perspective view of an end region of a pipe section fitted with an external reference target stencil in accordance with the invention, defining an annular radial display face.
Figure 2:
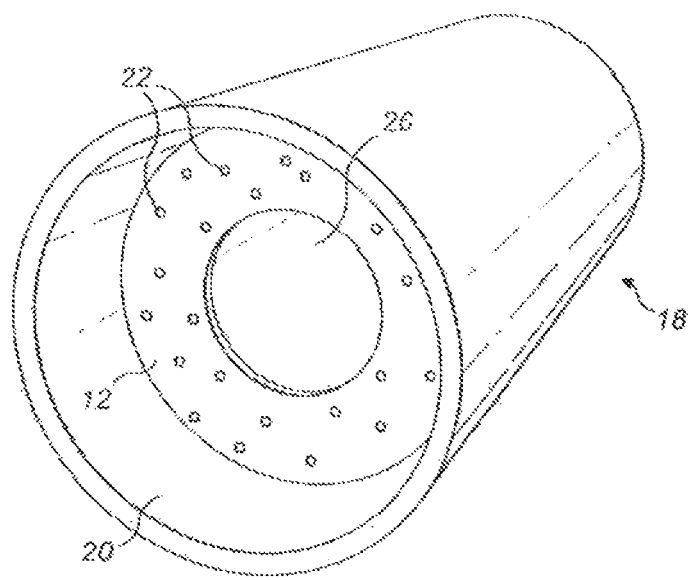
FIG. 2 is a perspective view of an end region of a pipe section fitted with an internal reference target stencil in accordance with the invention, also defining an annular radial display face.
Figure 3:
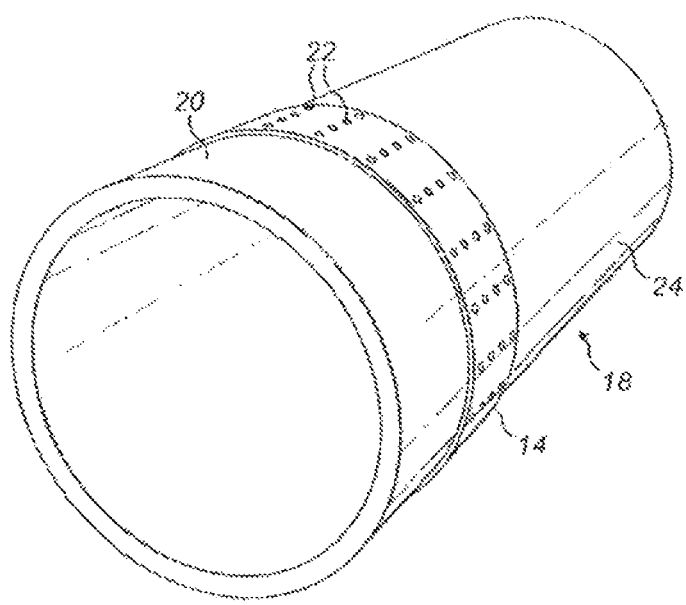
FIG. 3 is a perspective view of an end region of a pipe section fitted with another external reference target stencil in accordance with the invention, defining a cylindrical display face.
Figure 4:
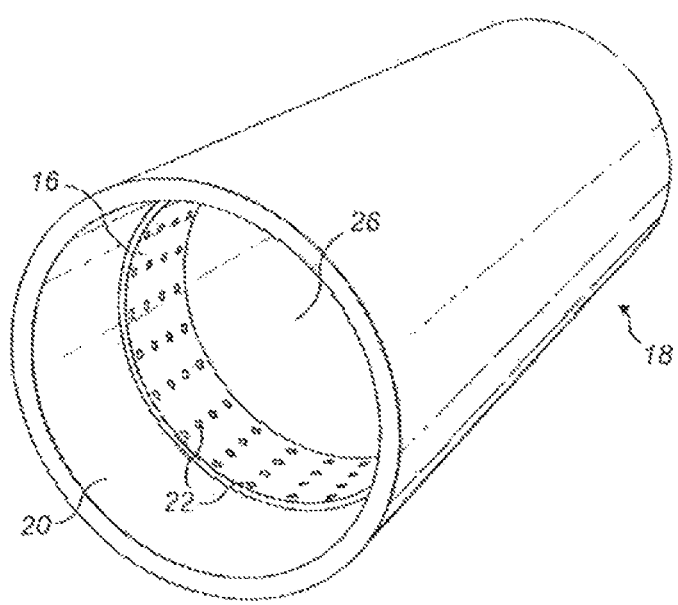
FIG. 4 is a perspective view of an end region of a pipe section fitted with another internal reference target stencil in accordance with the invention, also defining a cylindrical display face.

A visible display face of each stencil 10, 12, 14, 16 carries a multitude of reference targets 22 in the form of retro-reflective dots that may be distributed irregularly as shown in FIGS. 1 and 2 or in regular arrays as shown in FIGS. 3 and 4.

FIG. 1 shows a stencil 10 whose display face projects radially outwardly from an outer surface 24 of the pipe section 18. Conversely, FIG. 2 shows a stencil 12 whose display face projects radially inwardly from an inner surface 26 of the pipe section 18. Each stencil 10, 12 is a generally flat annular disc that, when mounted to pipe section 18 for use, lies in a plane orthogonal to a central longitudinal axis of the pipe section 18.

The stencil 10 shown in FIG. 1 has an inner diameter matching the outer diameter of the pipe section 18, whereas the stencil 12 shown in FIG. 2 has an outer diameter matching the inner diameter of the pipe section 18.

The stencils 14, 16 shown in FIGS. 3 and 4 are in the form of circumferential tapes or bands extending, respectively, around outer 24 and inner 26 surfaces of the pipe section 18. When mounted to those surfaces 24, 26 of the pipe section 18 for use, the stencils 14, 16 are short tubes with cylindrical display faces that are coaxial with the pipe section 18 in concentric relation.

The stencils 10, 12 shown in FIGS. 1 and 2 have self-supporting rigidity to keep their reference targets 22 in fixed relation to the pipe section 18. In contrast, the stencils 14, 16 shown in FIGS. 3 and 4 may be flexible, instead gaining support from the pipe section 18 when mounted to its outer 24 and inner 26 surfaces to keep their reference targets 22 in fixed relation to the pipe section 18.

The stencils 10, 12, 14, 16 are fixed temporarily to the pipe section 18 before the scanning operation so as not to move relative to the pipe section 18 until the scanning operation is complete. For this purpose, the stencils 10, 12, 14, 16 may be pressed against (e.g. clamped to or against or tightened around) the pipe section 18 or bonded to the pipe section 18, for example with double-sided tape or an adhesive backing. Magnetic attachment of the stencils 10, 12, 14, 16 is also possible where the pipe section 18 is of steel, as is typical. After the scanning operation, the stencils 10, 12, 14, 16 may be removed and optionally re-used on other pipe sections 18.

The stencils 10, 12, 14, 16 are simple to install and easy to remove. They apply and remove multiple reference targets 22 to and from the pipe section 18 in single, quick operations. Also, they are less susceptible to slippage or detachment than the individual reference targets of the prior art.

For ease of illustration, FIGS. 5 and 6 show all four of the reference target stencils 10, 12, 14, 16 of FIGS. 1 to 4 used together on a pipe section 18. Any two or more of the stencils 10, 12, 14, 16 may be used together in this way, but they need not be. Generally, internal measurements are more significant in the art of pipe fabrication and therefore one or both of the internal reference target stencils 12 and 16 of FIGS. 2 and 4 will be used in preference to either of the external reference target stencils 10 and 14 of FIGS. 1 and 3.

The side views of FIG. 5 show that the stencils 10, 12 of FIGS. 1 and 2 may have an enlarged base for attachment to the outer 24 and inner 26 surfaces of the pipe section 18.

FIGS. 5 and 6 also show that during the scanning operation, the reference targets 22 carried by each stencil 10, 12, 14, 16 are illuminated and their reflections sensed by a scanning device 28. The scanning device 28 is shown here as a hand-held device such as is offered by Creaform Inc. of Québec under its trade mark 'Handyscan 3D'.

An advantage of the invention is to enable the use of a hand-held scanning device 28, which is inexpensive, highly convenient and quick to use.

FIG. 6 shows how the scanning device 28 can be manipulated freely to measure the dimensional characteristics of the pipe section 18. For example, the scanning device 28 can be held above or below the end of the pipe section 18 as shown at 28A and 28B respectively; held inside the end of the pipe section 18 as shown at 28C; or held facing an edge of the pipe section 18 as shown at 28D and 28E.

Throughout, the scanning device 28 has line-of-sight visibility of multiple reference targets 22 carried by at least one of the stencils 10, 12, 14, 16 mounted on the pipe section 18. Even where the scanning device 28 faces an edge of the pipe section 18 as shown at 28D and 28E, the scanning device 28 can 'see' the reference targets 22 carried by the stencils 10 and/or 12. Prior art techniques such as those disclosed in WO 2006/094409 and WO 2011/138741 would suggest that separate reference targets should be applied directly to the inner and outer walls of the pipe section 18, but in such positions those reference targets would not be visible to a scanning device 28 facing an edge of the pipe section 18 as shown at 28D and 28E.

During a scanning operation, the scanning device 28 feeds a scanning data signal to a processing system 30 shown schematically in FIG. 5. The processing system 30 applies triangulation and other processing techniques known from the prior art such as WO 2006/094409 and WO 2011/138741 to that signal to determine the position and orientation of the scanning device 28 with respect to the pipe section 18. The processing system 30 correlates this information with scanned dimensional data relating to the pipe section 18 sent simultaneously from the scanning device 28.

By knowing the location of the scanning device 28 relative to the pipe section 18 at every instant, the processing system 30 gives meaning to dimensional data relating to the pipe section 18 as output from the scanning device 28. The scan output is a 3D model of the real product end geometry. The model is then post-processed to determine the cross-sectional geometry of the product end—including internal and external diameter, wall thickness, out-of-roundness including local out-of-roundness, planarity and longitudinal curvature—for consideration in the subsequent pipeline assembly process, which will usually involve welding. In addition to characteristics such as out-of-roundness and pipe wall thickness, it is also possible to determine pipe bevel characteristics.

The processing system 30 can output dimensional information relating to the pipe section 18 to an output device 32 which may, for example, comprise a memory to record the dimensional information and a monitor to view the dimensional information. Conveniently, the output device 32 is a portable computer, which could also perform tasks attributed to the processing system 30.

The processing system 30 can also interface with a pipe tracking system 34, for example using a bar code on a pipe section 18 to identify that pipe section 18 to the systems 30, 34. In this way, the dimensional characteristics of each pipe section 18 can conveniently be correlated with and stored against an appropriate one of the records of multiple pipe sections 18.

FIGS. 7 and 8 show preferred variants of the reference target stencils described previously; like numerals are used for like parts.

FIG. 7 corresponds to FIG. 5 but replaces the separate reference target stencils of FIGS. 1 to 4 with an internal pan-shaped reference target stencil 68. Again, the reference target stencil 66 is fixed inside a pipe section 18 a short distance inboard from one end, leaving an end portion 20 of the pipe section 18 exposed for scanning to determine its dimensional characteristics.

In effect, the reference target stencil 66 integrates the internal reference target stencils 12 and 16 of FIGS. 2 and 4. The reference target stencil 66 has the advantage of being a single, rigid, easy-to-install device that, after one simple installation operation, performs the duties of both of the internal reference target stencils 12 and 16.

The reference target stencil 66 of FIG. 7 comprises a radial display face 68 of a disc-shaped wall that lies in a plane orthogonal to a central longitudinal axis of the pipe section 18. The pan shape of the reference target stencil 66 is defined by a cylindrical display face 70 of a rigid tubular wall that surrounds the radial display face 68 as a short tube that is coaxial with the pipe section 18 in concentric relation.

As before, each display face 68, 70 of the reference target stencil 66 carries a multitude of reference targets 22 in the form of retro-reflective dots that may be distributed irregularly or in regular arrays.

The disc-shaped wall supporting the radial display face 68 and the tubular wall supporting the cylindrical display face 70 have an outer diameter slightly smaller than the internal diameter of the pipe section 18. This leaves a small clearance around the reference target stencil 66 that eases its movement along the pipe section 18 before being fixed in place.

In this example, the reference target stencil 66 is fixed in place within the pipe section 18 by radially-extending screws 72. The screws 72 are spaced angularly around, and extend through threaded holes in, the tubular wall that supports the cylindrical display face 70. The screws 72 approximately centralise the reference target stencil 66 in the pipe section 18 by equalising the gap around the tubular wall supporting the cylindrical display face 70. The screws 72 also clamp against the inner surface 26 of the pipe section 18 to lock the reference target stencil 66 in place for a scanning operation.

As noted above, internal measurements are generally more significant than external measurements in the art of pipe fabrication. Consequently, an internal reference target stencil 66 may be used in isolation as shown in FIG. 7, which will suffice for all internal measurements of the end portion 20.

An internal reference target stencil 66 may also suffice for scanning an edge of the pipe section 18, as sufficient reference targets 22 may be expected to remain visible to a scanner 28 even when the scanner 28 faces an edge as shown in FIG. 6 as 28D and 28E. Nevertheless, FIG. 8 shows that the internal reference target stencil 66 could be supplemented by an external reference target stencil 74 if required.

In effect, the external reference target stencil 74 shown in FIG. 8 integrates the external reference target stencils 10 and 14 of FIGS. 1 and 3. The external reference target stencil 74 therefore has the advantage of being a single, rigid, easy-to-install device that, after one simple installation operation, performs the duties of both of the external reference target stencils 10 and 14.

The external reference target stencil 74 comprises a radial display face 76 of an annular wall that lies in a plane orthogonal to a central longitudinal axis of the pipe section 18. An inner edge of the radial display face 76 extends as an L-section into a cylindrical display face 78 of a rigid short tubular wall that surrounds the pipe section 18 and is coaxial with the pipe section 18 in concentric relation. Again, each display face 76, 78 of the external reference target stencil 74 carries a multitude of reference targets 22 in the form of retro-reflective dots that may be distributed irregularly or in regular arrays.

The tubular wall supporting the cylindrical display face 78 and the annular wall supporting the radial display face 76 are suitably in two or more parts that can be assembled around the pipe section 18. Advantageously, this allows a clamping action against the outer surface 24 of the pipe section 18, to locate the external reference target stencil 74 in fixed relation to the pipe section 18.

Other variations are possible without departing from the inventive concept. For example, the invention is not limited to inspection of pipes but also enables inspection of other pipe-mounted objects such as valves, tees and forged pieces.

The invention claimed is:

1. A method of measuring a pipe, the method comprising:
attaching to the pipe at least one reference target support that supports and presents a plurality of scannable reference targets on a face upstanding from a surface of the pipe to which that support is attached, extending inwardly from an internal surface of the pipe or outwardly from an external surface of the pipe, wherein the reference target support extends around the pipe against an internal or external surface of the pipe; and
measuring the pipe by scanning the pipe with a handheld movable scanner, wherein the scanner scans the plurality of reference targets of the reference target support to provide a positional reference for the scanner during movement of the scanner.

2. The method of claim 1, comprising scanning an edge of the pipe between external and internal surfaces of the pipe during a scanning operation.

3. The method of claim 1, wherein the reference target support is attached to the pipe inboard of an end of the pipe and the scanner is used to scan an end portion of the pipe outboard of that support.

4. The method of claim 1, comprising temporarily attaching at least one reference target support to the pipe and, after scanning, removing that support from the pipe and optionally re-using the removed reference target support on another pipe to be measured.

5. A reference target support that is attachable to a pipe for use in measuring that pipe with a movable scanner, wherein the support has a display face that is upstanding from a surface of the pipe when the support is attached to the pipe, the display face presenting and supporting a plurality of scannable reference targets for enabling the scanner to maintain a positional reference during scanning movement, and wherein the display face has a curved inner or outer interface edge shaped to lie against a correspondingly-curved surface of the pipe.

6. The reference target support of claim 5 and having self-supporting rigidity such that the display face can stand up from a surface of the pipe to which the support is attachable.

7. A pipe in combination with at least one reference target support as defined in claim 5 attached to the pipe so that the reference target support display face is upstanding from a surface of the pipe, extending inwardly from an internal surface of the pipe or outwardly from an external surface of the pipe, wherein the reference target support extends around the pipe against an internal or external surface of the pipe.

8. The pipe of claim 7, wherein a reference target support is attached to the pipe inboard of an end of the pipe.

9. A system for measuring a pipe, operating in accordance with a method comprising:
attaching to the pipe at least one reference target support that supports and presents a plurality of scannable reference targets on a face upstanding from a surface of the pipe to which that support is attached, extending inwardly from an internal surface of the pipe or outwardly from an external surface of the pipe, wherein the reference target support extends around the pipe against an internal or external surface of the pipe; and
measuring the pipe by scanning the pipe with a handheld movable scanner, wherein the scanner scans the plurality of reference targets of the reference target support to provide a positional reference for the scanner during movement of the scanner.

10. A system for measuring a pipe, comprising a handheld moveable scanner and a reference target support that is attachable to the pipe for use in measuring the pipe with the moveable scanner, wherein the support has a display face that is upstanding from a surface of the pipe when the support is attached to the pipe, the display face presenting and supporting a plurality of scannable reference targets for enabling the scanner to maintain a positional reference during scanning movement, and wherein the display face has a curved inner or outer interface edge shaped to lie against a correspondingly-curved surface of the pipe.

11. A system for measuring a pipe, comprising a handheld moveable scanner and a reference target support that is attachable to the pipe for use in measuring the pipe with the movable scanner, wherein the support is arranged to lie against an underlying surface of the pipe to which the support is attachable while defining a cylindrical or part-cylindrical display face presenting and supporting a plurality of scannable reference targets for enabling the scanner to maintain a positional reference during scanning movement.

12. A pipe in combination with at least one reference target support attached to the pipe, wherein the support is for use in measuring the pipe with a moveable scanner and is arranged to lie against an underlying surface of the pipe while defining a cylindrical or part-cylindrical display face presenting and supporting a plurality of scannable reference targets for enabling the scanner to maintain a positional reference during scanning movement.

* * * * *